United States Patent Office 3,052,252
Patented Sept. 4, 1962

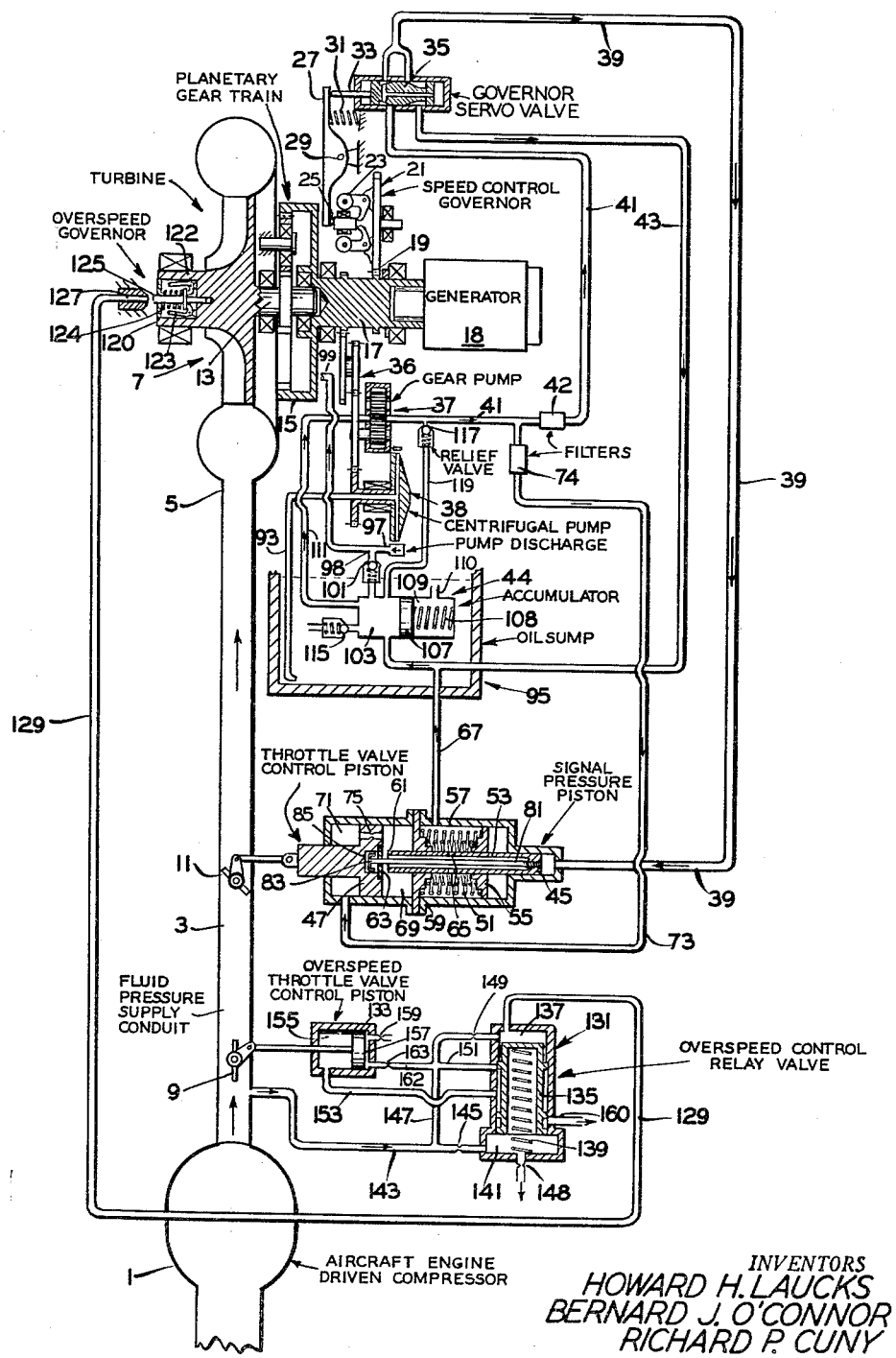

3,052,252
SPEED CONTROL SYSTEM FOR TURBINE AND LIQUID PRESSURE SUPPLY DEVICE
Howard H. Laucks, Sparta, N.J., Bernard J. O'Connor, Tuckahoe, N.Y., and Richard P. Cuny, Maywood, N.J., assignors to The Bendix Corporation, a corporation of Delaware
Filed Jan. 30, 1956, Ser. No. 562,153
8 Claims. (Cl. 137—27)

The present application relates to improvements in a pneumatic turbine drive control system of a type such as described and claimed in a co-pending U.S. application Serial No. 483,083, filed January 20, 1955, now Pat. No. 2,886,048, by Edward C. Palmenberg, and assigned to Bendix Aviation Corporation, assignee of the present application.

More particularly, the invention disclosed herein relates to a novel structural arrangement of a speed and overspeed control for a pneumatic turbine drive for use in aircraft and the provision of means to provide protection against adverse gravity conditions affecting hydraulic controls for such system under flight maneuvers encountered in aircraft.

In such a hydraulic control system in aircraft, the fluid pressure supply system during flight of the aircraft may be subject to adverse or zero gravity conditions during the diving and turning maneuvers of the craft, so that the usual gear-type fluid pressure supply pump in the system under such conditions may be momentarily starved for a supply of oil due to cavitation or zero gravity effects in the supply line. An object of the invention, therefore, is to provide novel means to avoid such adverse effects encountered during the flight maneuvers of the aircraft.

Another object of the invention is to provide a novel structural arrangement including a centrifugal sump pump installed so as to charge an accumulator for feeding the usual gear-type main supply pump with fluid under pressure during maneuvers of the plane so that the accumulator serves to feed the supply fluid under pressure to the gear pump to avoid the adverse effects which might otherwise result during the maneuvers of the plane.

Another object of the invention is to provide an improved double throttle valve control system arranged to supply a fluid pressure medium bled from an aircraft engine compressor so as to drive a turbine and therethrough aircraft accessories, such as a generator, and in which arrangement a first throttle valve control is maintained in an open position during all normal operations of the system and effective to shut off the supply of pressure medium to the turbine only under emergency overspeed turbine conditions, and in which a second throttle valve control is used for regulating the supply of fluid pressure medium to the turbine in response to the speed of the turbine so as to maintain the same at a predetermined rated speed.

Another object of the invention is to provide a novel control system for the first and second-mentioned control valves, the first of which is pneumatically operated, while the second and main control embodies a hydraulic control system in which protection is afforded against adverse gravity conditions encountered during flight maneuvers of the aircraft.

Another feature of the invention lies in various valve structures and arrangements whereby the flow of pressure air bled from an aircraft engine driven turbine serves to drive a turbine in response to sensed turbine speed conditions.

Another object of the invention is to provide a simple, efficient organization and arrangement of the various elements of the control system in cooperative association with one another whereby an efficient and practical turbine drive control system is obtained.

Another object of the invention is to provide an improved operating valve structure in cooperative association with one another to control the speed of the turbine drive.

The foregoing objects and advantages of the invention will appear more fully hereinafter from a consideration of the detailed description which follows, taken together with the accompanying drawing wherein an embodiment of the invention is illustrated. It is to be expressly understood, however, that the drawing is for purposes of illustration and description and is not to be construed as defining the limits of the invention.

The drawing is a detailed schematic illustration of the improved pneumatic turbine drive control system of the present invention.

Referring to the drawing, there is indicated by the numeral 1 a compressor which may be of conventional type driven by an aircraft engine and supplying air under pressure to the engine of the aircraft, as shown for example in a copending application Serial No. 475,398, now Pat. No. 2,934,288, filed December 15, 1954, by Charles H. MacIntyre and assigned to Bendix Aviation Corporation. As shown schematically in the drawing herein, such air under pressure is bled by a conduit 3 from the outlet of the compressor 1 to the inlet 5 of an air-driven turbine indicated by the numeral 7. There is provided in the conduit 3 a first adjustable throttle valve control 9 and a second adjustable throttle valve control 11.

The first throttle valve control 9 is maintained in an open position during all normal operations of the system and is only used as an emergency shut off in case of turbine overspeed, as will be explained in greater detail hereinafter.

The second throttle valve control 11 is used for regulating the air or fluid pressure medium supplied the turbine 7 and is controlled by the speed of the turbine 7. The turbine 7 drives through a shaft 13 and planetary gear train 15, a second shaft 17 which is connected to an aircraft accessory or generator 18 and through suitable gearing 19 to a speed control governor indicated generally by the numeral 21. The generator 18 may be connected to a suitable load circuit by a manual or generator speed responsive switch at a predetermined frequency. The speed control governor 21 includes suitable flyweights 23 acting through a rod 25 on one end of a lever 27 pivoted at 29 and which end of lever 27 is biased by a spring 31 into contacting relation with the rod 25. The other end of the lever 27 bears upon an actuating rod 33 of a hydraulic governor servo valve 35.

The turbine 7 further drives through the shaft 17 and suitable gearing 36, a gear pump 37, and a centrifugal pump 38. The structure of the hydraulic servo valve 35 is such that at rated speed the valve 35 regulates the hydraulic fluid pressure supplied to its control line 39 to a value of approximately one half of the hydraulic pump supply pressure supplied to the valve 35 through a supply line 41 and filter 42 from the gear-type fluid or oil pressure supply pump 37.

When the speed of the turbine 7 sensed by the speed control governor 21 increases above the rated speed, the governor servo valve 35 is adjusted to the right by a clockwise adjustment of lever 27, as viewed in the drawing, so that the control pressure supplied to the line 39 is raised to nearly the supply pressure in line 41 and conversely, when the speed of the turbine 7 is decreased below the rated speed, the valve 35 is adjusted to the left by a counter-clockwise adjustment of lever 27 and the control pressure in line 39 drops to nearly the discharge pressure in a line 43 leading from the governor servo valve 35 to an accumulator 44 in an oil sump, as hereinafter explained.

The fluid pressure medium in the control line 39 is fed to a signal pressure piston 45 controlling the operation of a piston 47 for positioning the second throttle control valve 11. The signal pressure piston acts against the biasing force of a spring 51 to adjustably position a control tube 53 to which there is affixed a spring guide member 55 slidably mounted in a chamber 57. Affixed at one end of the chamber 57 is a supporting member 59 and between the member 55 and supporting member 59 is mounted the spring 51. The arrangement is such that the piston 45 is adjustably positioned against the biasing force of the spring 51 in such a manner that the full stroke of the piston 45 is covered by the full range of pressure in the control line 39. Thus, the piston 45 is accurately positioned for each pressure variation in the control line 39 and, therefore, each speed of the turbine 7.

As shown in the drawing, the tubular member 53 has an open end 61 arranged to cooperate with a valve plate 63 affixed to the piston 47 and arranged to control the opening and closing of the open end 61 of the tube 53. Ports 65 lead from the interior of the tubular member 53 into the chamber 57 from which leads a discharge conduit 67 into the conduit 43 and thereby into the accumulator 44 in the sump, as hereinafter explained. Thus, the open end 61 of the tubular member 53 cooperates with the plate 63 as a valve for controlling fluid pressure applied in a chamber 69 at one side of the control piston 47. The opposite side of the piston 47, as shown in the drawing, is exposed to fluid pressure applied in a chamber 71 through a line 73 leading through a filter 74 from the outlet line 41 of the gear pump 37. Thus, the piston 47 has full pump pressure supplied to chamber 71, which fluid pressure medium is bled from the chamber 71 into chamber 69 through a bleed passage 75 in the piston 47. The area of the piston 47 exposed to the fluid pressure medium in the chamber 71 is one half the area of the piston 47 exposed to the pressure in the chamber 69 and, therefore, the piston 47 is in equilibrium when the pressure in the chamber 69 is one half the supply pressure in chamber 71.

It will be seen from the drawing that a movement of the piston 45 and tubular valve member 53 to the left will cause the opening 61 to tend to close, causing the pressure applied to the piston 47 in chamber 69 to increase and, in turn, causing the piston 47 to move to the left. The movement of the piston 47 to the left continues until the piston 45 and valve 53 reach the desired position of equilibrium at which the control pressure applied through line 39 to the signal pressure piston 45 is balanced by the biasing force of the spring 51 acting on the piston member 55. The signal pressure piston 45 is coupled by a rod 81 to a dash pot 83 slidably mounted in a chamber 85 formed in the piston 47 so as to dampen oscillations between the servo system controlling the signal pressure piston 45 and the servo system controlling the piston 47 to position the throttle valve 11.

It will be seen from the foregoing that when the speed of the turbine 7 increases, the control pressure applied in line 39 also increases, causing the throttle valve control piston 47 to move to the left, as viewed in the drawing, moving the throttle valve 11 to a more closed position so as to cut down on the fluid pressure medium supplied the turbine 7, and upon a decrease in the speed of the turbine 7, a reverse action is effected. This control easily maintains turbine speed within plus or minus five percent (5%) with all variations of air pressure, temperature and loads applied to the accessory or generator 18 driven through shaft 17.

*Protection From Adverse Gravity Conditions Occurring During Maneuvers of Aircraft*

In the present invention, the hydraulic fluid supply system has been improved so as to include novel means for protecting the system from adverse gravity conditions, often referred to as a "0" gravity condition, occurring during flight maneuvers of the aircraft. The usual difficulty experienced during such a "0" gravity condition is pump cavitation at the inlet to the supply pump, which may be of the gear pump type, and resulting in the pump momentarily starving for a suitable supply of oil. In order to overcome such adverse effects, there is provided in the present invention the centrifugal sump pump 38 having a fluid inlet conduit 93 leading from an oil sump indicated by the numeral 95.

The pump 38 has an oil pressure fluid outlet conduit 97 leading through a T connection 98 to a nozzle 99 to direct a stream or jet of lubrication oil to lubricate the planetary gear train 15. There also leads from the T connection 98 of the conduit 97 a check valve 101 opening into a chamber 103 of the accumulator 44. The accumulator 44 has a piston member 107 slidably mounted in the chamber 103 and biased against fluid pressure medium in the chamber 103 by a spring 108 positioned at the opposite side of the piston 107 in a chamber 109 opening through a passage 110 to the interior of the oil sump 95.

The centrifugal sump pump 38 serves to charge through outlet conduit 97 and check valve 101 the chamber 103 of the accumulator 44 with an oil pressure medium against the biasing force of the spring 108 acting on piston 107. The spring biased piston 107 in turn serves to bias the oil pressure fluid medium under force of spring 108 through discharge conduit 111 to the intake of the gear pump 37. Thus, should oil medium fail to flow momentarily from the sump 95 through conduit 93 to the inlet of the centrifugal pump 38 as upon cavitation in the supply conduit 93 due to prevailing gravity flight conditions or other cause, the check valve 101 closes, preventing loss by reverse flow of oil from the accumulator 44 to the discharge conduit 97 of the centrifugal pump 38.

Moreover, under such conditions, the reserve oil in chamber 103 is fed to the gear pump 37 through conduit 111 under the biasing force of spring 108 acting on piston 107. Any fluid medium thereafter supplied through conduit 93 to the centrifugal pump 38 and applied through discharge conduit 97 serves to open the check valve 101 and recharge the chamber 103 of the accumulator 44.

Further, the discharge fluid in conduit 43 leading from the governor servo valve 35 and the discharge fluid applied through conduit 67 from chamber 57 is fed into the chamber 103 of the accumulator 44 and, under normal operating conditions, excess oil is discharged to the oil sump 95 through a pressure regulator check valve 115. Further, opening from the fluid pressure outlet line 41 of the gear pump 37 is a high pressure relief or check valve 117 opening under high pressure conditions in the line 41 through a conduit 119 to the chamber 103 of the accumulator 44.

It will be seen from the foregoing that under normal operating conditions the fluid pressure medium in the chamber 103 of the accumulator 44 is supplied through conduit 111 to the inlet of the main gear supply pump 37 and, under adverse "0" gravity conditions, the spring 108 acting on the piston 107 serves to maintain oil in conduit 111 leading to the inlet of the gear pump 37 at a substantially constant minimum pressure so as to prevent cavitation in the line 111 and the gear pump 37 from momentarily starving for supply oil under "0" gravity conditions occurring during the flight maneuvers of the aircraft.

*Overspeed Control System*

The subject control system includes, in addition to the foregoing features, an overspeed control including a governor 120. The governor, as indicated by the numeral 120, is of the fly-ball type built into a shaft 122 of the turbine 7 and including fly-ball elements 123 opposed by a spring 124 acting on a pin 125 having a poppet end juxtaposed to a nozzle 127. The governor is effective under overspeed conditions to actuate the pin 125 so as to close the air nozzle 127. In the latter action, the centrifugal force acting on fly-ball elements 123 of the governor 120 is opposed by the spring 124 and the force of actuating fluid issuing from the nozzle 127 and acting on the poppet end of the axial element or pin 125. The nozzle 127 is connected through a conduit 129 to an overspeed control relay valve indicated generally by the numeral 131, and which relay control valve 131 serves to control the position of the overspeed throttle valve control piston 133 so that upon the closing of the nozzle 127 by pin 125, the piston 133 adjustably positions the air throttle control valve 9 and causes the same to close under predetermined overspeed conditions.

The overspeed control relay valve 131, as shown in the drawing, includes a piston valve 135 slidably mounted in a chamber 137 and normally biased upwardly under force of a spring 139 in opposition to fluid pressure applied in the chamber 137. Control piston 135 has fluid pressure medium applied both at the chamber 137 and at an opposite chamber 141. Fluid pressure medium is applied through a conduit 143 leading from the upstream side of the valve 9 and through a restriction 145 to the chamber 141 while a second conduit 147 leads from the conduit 143 to the chamber 137 through a second restriction 149. The chamber 137 is normally open to atmosphere through the conduit 129 and an unrestricted exhaust nozzle opening 127, while the chamber 141 is bled to atmosphere through a restricted opening 148 so that the pressure in chamber 137 above the relay piston 135 under such normal operating conditions is always lower than that in chamber 141 so that the greater fluid pressure in chamber 141, together with the force of spring 139, tends to hold the relay piston valve 135 in the upward position shown in the drawing. The nozzle 127 remains unrestricted under all normal turbine speeds and the relay piston valve 135 in the upward adjusted position directs pressure air to the overspeed control valve piston 133 as explained hereinafter.

High pressure air is applied through conduits 143, 147, 151, valve 135, and conduit 153 to chamber 155, biasing the piston 133 to the right toward the chamber 157 at the opposite side of the piston 133 and which chamber is fed air through conduit 162 and restriction 163 and bled to atmosphere through a bleed 159. The throttle control valve 9 is, therefore, held open as long as the relay piston valve 135 is not adjusted from the position shown.

When the turbine 7 overspeeds due to any cause, the overspeed governor 120 actuates the valve pin 125 outward so as to close the air exhaust nozzle 127. The closing of the nozzle 127 causes the fluid pressure applied to the now closed chamber 137 to increase, moving the piston 135 downward against the lower pressure in chamber 141 which is being constantly bled off through the restriction 148. Such new position of the valve 135 causes the fluid pressure medium heretofore applied to chamber 155 to be dumped through conduit 153, valve 131, and valve discharge conduit 160 to atmosphere. A greater pressure is then applied in chamber 157 through conduits 143, 147, 162, and restriction 163 biasing the piston 133 to the left and closing the fluid pressure control valve 9. The latter action shuts off the air supply to the turbine 7.

The valve 131 is so arranged that it is held in the last-mentioned adjusted position causing valve 9 to be held in the closed position so long as air is being supplied to the turbine inlet tube 3 under pressure of the compressor 1. Valve 131 is held in adjusted position (which closed valve 9 after overspeed) because the long conduit 129 and reopened nozzle 127 constitute a restricted flow path in relation to the presure flow to the top of piston 135 which is provided by unrestricted conduit 151 and through restriction 149. Conduit 151 admits pressure air when the piston 135 is moved down at overspeed. Thus, the pressure force on the top of the piston 135 exceeds the forces on the bottom and valve 131 remains adjusted to close valve 9 until the supply of pressure air is stopped. When the supply of air under pressure is terminated, the relay valve 135 under force of the spring 139 is shifted back to the previous position, shown in the drawing, and the device is reset for normal operation.

Although but one embodiment of the invention has been illustrated and described in detail, it is to be expressly understood that the invention is not limited thereto and various changes may be made in the design and arrangement of the parts without departing from the spirit and scope of the invention, as the same will now be understood by those skilled in the art.

What is claimed is:

1. In an aircraft a speed regulating system for a fluid pressure driven turbine, comprising a speed control governor responsive to the driven speed of the turbine, a gear pump driven by the turbine, a centrifugal pump driven by the turbine, an accumulator for storing a liquid medium, a first conduit for conducting a flow of liquid medium from an outlet of said gear pump to an inlet of said accumulator, a second conduit for conducting a flow of liquid medium from an outlet of said centrifugal pump to an inlet of said accumulator, check valve means in said first and second conduits to prevent reverse flow of liquid medium in said conduits from said accumulator, a third conduit leading from an outlet of said accumulator to an inlet of said gear pump and being free of any flow restriction, a fourth conduit leading from the outlet of said gear pump, servo motor means operatively connected to said fourth conduit, servo valve means operated by the speed governor to control the liquid medium applied to said servo motor means through said fourth conduit, a main control valve adjustably positioned by said servo motor means to vary the fluid pressure applied to the turbine so as to maintain the driven speed of the turbine at a predetermined value, a sump and a check valve opening from said accumulator for supplying excess liquid medium from the accumulator to the slump, a fifth conduit leading from the sump to the inlet of the centrifugal pump, and said accumulator including a piston and a spring to bias the piston so as to force the stored liquid medium from said accumulator through said third conduit to the inlet of the gear pump so as to meet the liquid inlet requirements of said gear pump upon the centrifugal pump failing to supply sufficient liquid medium to the accumulator through the second conduit to meet the liquid inlet requirements of the gear pump under adverse gravity conditions prevailing during maneuvers of the aircraft.

2. In a speed control system, a fluid pressure driven turbine, an overspeed governor driven by the turbine, a conduit for supplying fluid to the turbine, a main control valve in said conduit adjustable to a first position at which the valve is ineffective on the flow of fluid pressure applied to the turbine and further adjustable to a second position at which the valve is effective to terminate the flow of fluid pressure applied to the turbine, servo motor means biased in one sense to adjustably position the valve to said second position, selective means operable in a first manner to connect said servo motor means to the conduit at the inlet side of said valve so as to effect operation of the servo motor means in a second sense to adjustably position said valve in said first position, the selective means being operable in a second manner to disconnect said servo motor means from said conduit so as to effect operation of said servo motor means in said one sense, said governor including means controlling said selectively operable means so as to effect operation of said servo motor means in said one sense upon the driven speed of the turbine sensed by said governor exceeding a predetermined maximum value, said selectively operable means including means to hold the servo motor means in said one sense and accordingly said control valve in said second adjusted position so long as said fluid pressure continues to be applied to the inlet side of the control valve, and spring means to actuate the selectively operable means in said first manner to terminate the operation of said holding means upon cessation of the flow of fluid pressure applied to the inlet side of the control valve.

3. In an aircraft, the combination comprising a gear pump and a centrifugal pump driven from a common shaft, an accumulator for storing a liquid medium, a first conduit for conducting a flow of liquid medium from an outlet of said gear pump to an inlet of said accumulator, a second conduit for conducting a flow of liquid medium from an outlet of said centrifugal pump to an inlet of said accumulator, check valve means in said first and second conduits to prevent reverse flow of liquid medium in said conduits from said accumulator, a third conduit leading from an outlet of said accumulator to an inlet of said gear pump, and being free of any flow restriction, a fourth conduit leading from the outlet of said gear pump, servo motor means operatively connected to said fourth conduit, servo valve means to control the liquid medium applied to said servo motor means through said fourth conduit, conduit means arranged to return liquid medium from said servo valve means and said servo motor means to said accumulator, and said accumulator including a piston and a spring to bias the piston so as to force the stored liquid medium from said accumulator through said third conduit to the inlet of the gear pump so as to meet the liquid inlet requirements of said gear pump upon the centrifugal pump failing to supply sufficient liquid medium to the accumulator through the second conduit to meet the liquid inlet requirements of the gear pump under adverse gravity conditions prevailing during maneuvers of the aircraft.

4. The combination defined by claim 3 including a sump and a check valve opening from said accumulator for supplying excess liquid medium from the accumulator to the sump, and a fifth conduit leading from the sump to the inlet of the centrifugal pump.

5. In an aircraft a speed regulating system for a fluid pressure driven turbine, comprising a speed control governor responsive to the driven speed of the turbine, a gear pump driven by the turbine, a centrifugal pump driven by the turbine, an accumulator for storing a liquid medium, a first conduit for conducting a flow of liquid medium from an outlet of said gear pump to an inlet of said accumulator, a second conduit for conducting a flow of liquid medium from an outlet of said centrifugal pump to an inlet of said accumulator, check valve means in said first and second conduits to prevent reverse flow of liquid medium in said conduits from said accumulator, a third conduit leading from an outlet of said accumulator to an inlet of said gear pump and being free of any flow restriction, a fourth conduit leading from the outlet of said gear pump, servo motor means operatively connected to said fourth conduit, servo valve means operated by the speed governor to control the liquid medium applied to said servo motor means through said fourth conduit, a main control valve adjustably positioned by said servo motor means to vary the fluid pressure applied to the turbine so as to maintain the driven speed of the turbine at a predetermined value, and said accumulator including a piston and a spring to bias the piston so as to force the stored liquid medium from said accumulator through said third conduit to the inlet of the gear pump so as to meet the liquid inlet requirements of said gear pump upon the centrifugal pump failing to supply sufficient liquid medium to the accumulator through the second conduit to meet the liquid inlet requirements of the gear pump under adverse gravity conditions prevailing during maneuvers of the aircraft, a sump and a check valve opening from said accumulator for supplying excess liquid medium from the accumulator to the sump, a fifth conduit leading from the sump to the inlet of the centrifugal pump, a sixth conduit leading from the servo valve means to supply excess liquid medium from the servo valve means to an inlet to said accumulator, said servo motor means including a main piston operatively connected to the main control valve and an auxiliary piston controlled by the servo valve means, said auxiliary piston including a tubular valve means cooperating with the main piston to control the application of liquid medium from the outlet of the gear pump to the main piston to adjustably position the main piston and thereby the main control valve with changes in the speed of the turbine, and conduit means leading from the outlet of the tubular valve means to an inlet to said accumulator to supply the accumulator with excess liquid medium.

6. In an aircraft a speed regulating system for a fluid pressure driven turbine, comprising a speed control governor responsive to the driven speed of the turbine, a gear pump driven by the turbine, a centrifugal pump driven by the turbine, an accumulator for storing a liquid medium, a first conduit for conducting a flow of liquid medium from an outlet of said gear pump to an inlet of said accumulator, a second conduit for conducting a flow of liquid medium from an outlet of said centrifugal pump to an inlet of said accumulator, check valve means in said first and second conduits to prevent reverse flow of liquid medium in said conduits from said accumulator, a third conduit leading from an outlet of said accumulator to an inlet of said gear pump and being free of any flow restriction, a fourth conduit leading from the outlet of said gear pump, servo motor means operatively connected to said fourth conduit, servo valve means operated by the speed governor to control the liquid medium applied to said servo motor means through said fourth conduit, a main control valve adjustably positioned by said servo motor means to vary the fluid pressure applied to the turbine so as to maintain the driven speed of the turbine at a predetermined value, and said accumulator including a piston and a spring to bias the piston so as to force the stored liquid medium from said accumulator through said third conduit to the inlet of the gear pump so as to meet the liquid inlet requirements of said gear pump upon the centrifugal pump failing to supply sufficient liquid medium to the accumulator through the second conduit to meet the liquid inlet requirements of the gear pump under adverse gravity conditions prevailing during maneuvers of the aircraft, an overspeed governor driven by the turbine, a second control valve adjustable to a first position at which the second valve is ineffective on the fluid pressure applied to the turbine and said second valve adjustable to a second position at which the second valve is effective to terminate the fluid pressure applied to the turbine, servo motor means operable in one sense to adjustably position the second valve to said second position, selective means operable in a sense to connect said servo motor means to the fluid pressure at the inlet side of said second valve so as to effect operation of the servo motor means in said one sense, said overspeed governor including means controlling said selectively operable means so as to effect operation of said servo motor means in said one sense upon the driven speed of the turbine sensed by said overspeed governor exceeding a predetermined maximum value.

7. In an aircraft, the combination comprising a gear pump and a centrifugal pump driven from a common shaft, an accumulator for storing a liquid medium, a first conduit for conducting a flow of liquid medium from an outlet of said gear pump to an inlet of said accumulator, a second conduit for conducting a flow of liquid medium from an outlet of said centrifugal pump to an inlet of said accumulator, check valve means in said first and second conduits to prevent reverse flow of liquid medium in said conduits from said accumulator, a third conduit leading from an outlet of said accumulator to an inlet of said gear pump and being free of any flow restriction, a fourth conduit leading from the outlet of said gear pump, servo motor means operatively connected to said fourth conduit, servo valve means to control the liquid medium applied to said servo motor means through said fourth conduit, said accumulator including a piston and a spring to bias the piston so as to force the stored liquid medium from said accumulator through said third conduit to the inlet of the gear pump so as to meet the liquid inlet requirements of said gear pump upon the centrifugal pump failing to supply sufficient liquid medium to the accumulator through the second conduit to meet the liquid inlet requirements of the gear pump under adverse gravity conditions prevailing during maneuvers of the aircraft, said servo motor means including a main piston and an auxiliary piston controlled by the servo valve means, said auxiliary piston including a tubular valve means cooperating with the main piston to control the application of liquid medium from the outlet of the gear pump to the main piston to adjustably position the main piston, and conduit means leading from the outlet of the tubular valve means to an inlet to said accumulator to supply the accumulator with excess liquid medium.

8. The combination defined by claim 6 in which said selectively operable means includes means to hold the servo motor means and said second control valve in said second adjusted position so long as said fluid pressure continues to be applied to the inlet side of the second control valve, and spring means to actuate the selectively operable means in another sense to terminate the operation of said holding means upon cessation of the fluid pressure applied to the inlet side of the second control valve.

References Cited in the file of this patent

UNITED STATES PATENTS

| | | |
|---|---|---|
| 542,702 | Christensen | July 16, 1895 |
| 1,626,804 | Flanders | May 3, 1927 |
| 1,771,720 | Miller | July 29, 1930 |
| 1,936,566 | Davenport | Nov. 21, 1933 |
| 2,009,417 | Schwendner | July 30, 1935 |
| 2,010,420 | Simmen | Aug. 6, 1935 |
| 2,237,118 | Schwendner | Apr. 1, 1941 |
| 2,290,187 | Holt | July 21, 1942 |
| 2,698,576 | Strub | Jan. 4, 1955 |
| 2,869,565 | Cliborn | Jan. 20, 1959 |

FOREIGN PATENTS

| | | |
|---|---|---|
| 478,121 | France | Aug. 31, 1915 |